3,316,226
OLEFINE COPOLYMERS
Keith Jasper Clark, Welwyn Garden City, Rex Percival Palmer, Knebworth, and Annette la Touche Turner-Jones, Welwyn Garden City, England, assignors to Imperial Chemical Industries Limited, London, England, a corporation of Great Britain
No Drawing. Filed Jan. 13, 1964, Ser. No. 337,143
Claims priority, application Great Britain, Jan. 17, 1963, 2,156/63
17 Claims. (Cl. 260—88.2)

This invention relates to olefine copolymers.

Most known copolymers of olefines are poorly-crystalline or amorphous rubbery materials over a wide range of composition. Thus for example copolymers of ethylene and propylene are most useful as elastomeric compositions. Copolymers of 3-methyl-butene-1 with certain straight-chain α-olefines have been described and have been reported to be elastomers over certain composition ranges. However, surprisingly we have now discovered that copolymers of 3-methyl-butene-1 with n-butene-1 are highly crystalline to X-ray examination over their entire range of composition.

We find that at high n-butene-1 contents the effect of the presence of 3-methyl-butene-1 in the copolymer is to stabilise the crystalline form of the polymer in a form or forms closely related to that of Type II polybutene-1. Type II polybutene-1 is otherwise metastable and converts to Type I polybutene-1 having a higher density, at room temperature. This conversion is commercially disadvantageous, producing shrinking of mouldings and voiding with consequent haziness in film. Surprisingly, the compositions here described remain in the "Type II" form even after stretching into films or fibres. Type I and Type II polybutene-1 are discussed and described by Natta et al. in Rendiconti dell'Accademia Nazionale dei Lincei 19 (8), 1955, pages 404 et seq. and Zanetti et al. in La Chimica e l'Industria 43 (7), 1961, pages 735 et seq. Very little 3-methyl-butene-1 seems to be necessary to give some degree of stabilisation; thus we find that polybutene-1 prepared by polymerization in the presence of a small quantity of 3-methyl-butene-1 is noticeably more stable in the "Type II" form than polybutene-1 prepared in the absence of any 3-methyl-butene-1, even though the former material contains less 3-methyl-butene-1 than can be detected by infra-red analysis.

However, we find that to render the "Type II" crystalline lattice stable a few percent by weight of 3-methyl-butene-1 is required in the final polymer. Thus in mouldings of copolymers containing about 5% of 3-methyl-butene-1 partial conversion of the "Type II" form to "Type I" as shown by X-ray diffraction takes place at a reduced rate compared with the rate of conversion in polybutene-1 homopolymers, but polymers containing 9% or more 3-methyl-butene-1 remained stabilised wholly in the "Type II" form for several months. Mechanical shock, e.g. hitting with a hammer, which is known to produce practically instantaneous conversion to "Type I" in polybutene-1 homopolymers, produced only a very little "Type I" crystallinity in polymers containing 9% and 17% 3-methyl-butene-1 respectively. Thus moulded materials from polymers containing 9% or more 3-methyl-butene-1 are effectively free of the density changes associated with the conversion from "Type II" to "Type I" crystallinity.

When sheets, extruded fibres, etc. of polybutene-1 homopolymers, initially in the "Type II" crystalline form, are stretched into oriented fibres or films, a rapid change from the "Type II" form to the "Type I" form occurs. However, when copolymers containing a few percent of 3-methyl-butene-1 are subjected to the same process the "Type II" crystalline form is substantially stable. Oriented fibres drawn at 80° C. from pressed sheets of a copolymer containing only 9% 3-methyl-butene-1 showed the "Type II" crystalline form with only a very small proportion of "Type I" present. As the temperature at which drawing took place was decreased the proportion of "Type I" produced increased a little but "Type II" remained the predominant form. After drawing, substantially no conversion of the "Type II" crystallinity present to "Type I" occurred. As the proportion of 3-methyl-butene-1 in the copolymer increases the proportion of "Type I" crystallinity produced on stretching decreases and the stabilisation of the "Type II" form becomes more perfect. Thus on stretching strips of sheet of a copolymer containing 23% 3-methyl-butene-1 at 80° C. no "Type I" crystallinity was produced and the oriented fibre showed "Type II" crystallinity only; no "Type I" had developed after twelve months.

Thus, although a little "Type I" crystallinity may sometimes be produced in copolymers containing 9% or more 3-methyl-butene-1 on stretching into fibres and films, these are substantially free of the density changes associated with the "Type II"→"Type I" conversion.

We have also found that those crystalline copolymers of 3-methyl-butene-1 and n-butene-1 which contain more than 30% by weight of n-butene-1 when made under suitable conditions have good light-transmitting properties.

According to the present invention, therefore, we provide a crystalline copolymer of 3-methyl-butene-1 containing between 20% and about 90% by weight of n-butene-1, having a predominant crystalline form or forms substantially stable at room temperature and closely related to that of Type II polybutene-1. We further provide such copolymers which contain at least 30% and preferably 40% by weight of n-butene-1 and which are transparent (as hereinafter defined). We further provide transparent articles made from such transparent copolymers.

Percentage compositions by weight were obtained from the intensities of absorption bands in the copolymer, infra-red spectra at $13.15\mu$ and $8.47\mu$. The former band is mainly due to n-butene-1 absorption but a small correction was necessary to account for 3-methyl-butene absorption at this wavelength.

The weight concentrations were calculated using the values for absorbance per cm. ($\epsilon$) which were obtained from the spectra of each homopolymer.

$\epsilon$ at $13.1\mu = 85$ for polybutene-1.
$\epsilon$ at $13.1\mu = 16$ for poly-3-methyl-butene-1.
$\epsilon$ at $8.47\mu = 105$ for poly-3-methyl-butene-1.

In this specification, the word "transparent" shall be taken to mean "capable of being transformed by a melt shaping process into articles of which an ⅛″ thick section has a degree of clarity of at least Grade I (as herein defined) and a degree of haze of Group 1 (as herein defined)"; when used of articles, the word "transparent" shall be taken to mean "having in ⅛″ thick section a degree of clarity of at least Grade I (as herein defined) and a degree of haze of Group 1 (as herein defined)."

Overall impressions of transparency depend on two factors: clarity and haze. We define clarity as the ability to transmit light from distant objects without scattering. It is reduced by forward scattering at small angles particularly within 0.5° of the incident beam. When the clarity is perfect, the sharpness of outline and resolution of detail of distant objects viewed through parallel sided specimens are unaffected. For measuring clarity we use the following method.

A sample is prepared of ⅛″ thickness. To eradicate scattering at surface scratches or imperfections, thin glass plates are stuck to the surfaces of the sample with an oil e.g. olive oil, having a refractive index close to that of the copolymer under test. Through this sample, using a fixed observation distance of 1.5 metres, a series of charts each consisting of equal width black and white lines arranged vertically, horizontally and diagonally are used. The line widths in the series are 1.0, 0.6, 0.24, and 0.175 millimetres, corresponding to angular resolutions of 0.038, 0.029, 0.0092 and 0.0067° (semi-angle). Tests are carried out in a dark room. The charts are illuminated at the most suitable brightness which is found to be about 500 candles per square metre. The sample is held close to one eye and the chart with the smallest spacing that can be resolved is noted and compared with the finest spacing that can be resolved in the absence of the sample. The results can then be expressed in terms of the loss of angular resolution due to the introduction of the sample between the eye and the charts and are independent of the limiting resolution of the eye of the observer.

For the purposes of this invention we distinguish four degrees of clarity. The clarity of mouldings from any particular sample of polymer depends not only on the conditions employed in preparing the polymer sample, but also on the conditions employed in making the mouldings.

The four degrees are:

Grade I—Loss of 0.0200° (semi-angle) resolution or less;
Grade II—Loss of 0.0100° (semi-angle) resolution or less;
Grade III—Loss of 0.0025° (semi-angle) resolution or less;
Grade IV—No loss in visual resolution.

We define haze as the degree of scattering at high angles to the transmitted beam. Haze causes turbidity and hence reduction in contrast. To measure it, the intensity of light scattered from semi-angles of 2½°–90° to the incident transmitted beam is integrated and compared with the total transmittance (0°–90°) of the sample.

We employ the method described in the American Society for Testing Materials publications "ASTM Standards on Plastics," 11th edition, 1959, as method No. 1003-59T.

In the polymers and articles of our invention we distinguish four degrees of haze.

| | Percent haze |
|---|---|
| Group 1 | 0–45 |
| Group 2 | 0–30 |
| Group 3 | 0–15 |
| Group 4 | 0–5 |

The haze in a moulding, like the clarity, depends on both polymer quality and moulding conditions.

The copolymers of our invention have a wide range of useful properties. Poly-3-methyl-butene-1 melts at 310° C., while Type II crystalline polybutene-1 melts at 118.5° C. The crystalline melting point of the copolymers varies approximately linearly between the two according to the molar proportion of the two monomers. Thus by choosing suitable proportions of the two monomers it is possible to provide a crystalline polyolefine material suitable for forming into mouldings, sheets, films and fibres having any desired melting point in a wide temperature range.

In mechanical properties e.g. modulus, the copolymers of this invention are broadly similar to polythene, particularly at room temperature and above, those containing a higher proportion of 3-methyl-butene being similar to high density polythene, while those which contain less 3-methyl-butene-1 are more similar to low density polythene. As the proportion of butene-1 increases, the Vicat softening point of the material at first drops rapidly and then steadies, and copolymers containing 60%–80% by weight of butene-1 have Vicat softening points in the region of 80° C. The transparency of these copolymers makes them extremely suitable for the manufacture of bottles (by blow-moulding) and for film. The copolymers containing a high proportion of butene-1 are, like polybutene-1 itself, completely soluble in hot heptane.

The monomers used in our invention polymerise at different rates; n-butene-1 is markedly more reactive than 3-methyl-butene-1. For this reason, merely mixing a quantity of n-butene-1 with a quantity of 3-methyl-butene-1 under polymerising conditions is not sufficient to obtain a copolymer of uniform composition throughout. Under such conditions the polymer first formed will be rich in n-butene-1, while polymer formed subsequently is rich in 3-methyl-butene-1, and the properties of the resulting copolymer will be nearer to those of a blend of the two homopolymers than to those of a copolymer of uniform composition.

Further, therefore, according to this invention we provide a process for the copolymerisation of 3-methyl-butene-1 with butene-1 wherein the two monomers are subjected to polymerising conditions in the presence of a polymerisation catalyst under conditions such that the rate of polymerisation of each monomer is substantially constant throughout the polymerisation reaction.

The rate of polymerisation of each monomer is proportional to its concentration in the polymerisation phase. Thus there are two main ways in which the rate of reaction of each monomer can be kept substantially constant; by passing each monomer into the reaction zone at the rate at which it is consumed, or by operating in substantial excess of one monomer (e.g. in bulk). As n-butene-1 polymerises faster than 3-methyl-butene-1, it is particularly useful to use 3-methyl-butene-1 as diluent for the reaction. n-butene-1 may be passed in at a suitable fixed rate, or the reaction may be carried out under a fixed pressure of n-butene-1.

As catalyst for the polymerisation reaction there may be used mixtures of organometallic compounds with transition metal compounds, e.g. titanium tetrachloride activated by aluminium triethyl. It is preferable to use the more highly stereospecific catalyst combinations known to the art, such as for example, titanium trichlorides with aluminium alkyl chlorides. The importance of using a highly stereospecific catalyst varies in accordance with the composition of the copolymer being made; 3-methyl-butene-1 and mixtures rich in this monomer polymerise very readily to solid relatively insoluble crystalline polymers; however, butene-1 and monomer compositions rich in butene-1 generally require highly stereospecific catalysts to give easily handleable slurries of solid copolymer. A highly stereospecific catalyst particularly useful for giving readily handleable slurries comprises an organo-aluminium activator and titanium trichloride obtained by reducing titanium tetrachloride by adding aluminium dialkyl chloride gradually thereto at a temperature between −20° C. and +20° C. The temperature of polymerisation may vary but is preferably kept fairly low, e.g. about 20–50° C.; it is particularly necessary to keep the temperature down when copolymers rich in n-butene-1 are being formed, as otherwise sticky gels rather than handleable slurries tend to be formed. If the reaction is carried out in a diluent rather than in bulk, inert hydrocarbons, e.g. n-heptane, are suitable diluents. Preferably the reaction is carried out at or near atmospheric pressure. Air and water inhibit the polymerisation catalysts used, so that reaction must be carried out in substantial absence of these; nitrogen may be used as atmosphere. When polymerisation is complete, the catalyst may be killed by addition of alcohol and the polymer de-ashed by known methods, e.g. by filtering, reslurrying and washing with further quantities of an alcohol, or a mixture of alcohol and a chelating agent, such as acetylacetone. Polymer of higher clarity and lower haze is in general best obtained by de-ashing separable slurries of copolymers in organic media with water-free reagents.

Transparent articles may be made from the transparent polymer of our invention by known melt-shaping methods such as injection-moulding, compression moulding, extrusion and blow-moulding.

The following examples illustrate our invention but do not limit it in any way.

Example 1

A litre flask surrounded by a water bath and fitted with a stirrer and a condenser cooled with water was carefully dried and purged of air with a current of oxygen-free nitrogen. 500 cc. of 3-methyl-butene-1 were placed in the flask together with 20 milligram-atoms Ti in the form of a trivalent titanium halide (obtained by the reduction of TiCl₄ by adding it gradually to aluminium ethyl sesquichloride in hydrocarbon solution) and 48 millimoles of aluminium diethyl chloride. The reaction mixture was brought to its boiling point and butene-1 was passed in at a pressure of 200 mm. of mercury. The external bath temperature was 29° C. Polymerisation with stirring was continued for 3¼ hours. At the end of this time a swollen slurry was obtained. It was de-ashed by addition of a mixture of 50 mls. of acetylacetone and 300 mls. isopropanol followed by stirring for 1 hour at 30° C., separation of the liquid and solid phases in a sintered filter and repeated washing with dry methanol. 42 grams of swollen rather lumpy copolymer were obtained, having a composition determined by infra-red spectroscopy of 80% butene-1 by weight. A sample of the polymer was moulded in a 2 x 2 x ⅛" preform in a press at a temperature of 250° C. and a pressure of 20 tons/sq. inch for five minutes. The pressing obtained was flexible, and very faintly blue hazed, with a melting point of 125° C. and a Vicat of 81.5. It showed clarity of Grade IV and 14% haze (Group 3.)

Example 2

The apparatus of Example 1 was used. 250 mls. 3-methyl-butene-1 were placed in the flask together with 107 millimoles of aluminium diethyl chloride and 40 milligram atoms Ti in the form of trivalent titanium halide obtained as in Example 1. Butene-1 was fed into the flask through a rotameter at 3.2 litres per hour, the concentration of butene-1 monomer in the flask being kept in this way approximately constant. A good slurry formed. After 5 hours the reaction was killed by addition of 100 mls. acetylacetone mixed with 200 mls. of isopropanol, the mixture was filtered on a sinter, washed several times with isopropanol and finally with methanol. 54.5 grams of white powder were obtained, containing 61% by weight of butene-1, having a crystalline melting point of 228° C. and a Vicat softening point of 88° C. A sample moulded as in Example 1 showed clarity of Grade IV and haze of Group 3.

Example 3

A catalyst was prepared as follows:

550 mls. of TiCl₄ and 1 litre of purified hydrocarbon diluent (free of aromatic compounds) were added to a 6 litre vessel fitted with a stirrer which had been purged with nitrogen. The temperature was maintained at 0° C. A 25% W./W. solution of aluminium ethyl sesquichloride in diluent containing 4.0 moles of aluminium diethyl chloride was gradually added to the stirred TiCl₄ solution over a period of 14 hours at 0° C. On completion of the addition, stirring was continued for a further two hours after which the temperature was slowly raised to 95° C. and held there for a further 4 hours. The slurry was cooled and washed 4 times by decantation with fresh diluent and finally reslurried in diluent.

A litre flask surrounded by a water-bath and fitted with a stirrer and water-cooled condenser was carefully dried and purged of air by passing oxygen-free nitrogen through it. 400 ccs. of 3-methyl-butene-1 were placed in the flask together with 15 millimoles of the TiCl₃ catalyst prepared as described, and 45 millimoles aluminium diethyl chloride. Butene-1 was passed into the flask to saturate it and create a pressure of 20 mm. Hg above atmospheric. Polymerisation took place at this pressure and a temperature of 20° C. for 9 hours. A good slurry of fine particles resulted. The reaction mixture was then treated with 400 mls. dry isopropyl alcohol and left to stand overnight. Catalyst residues were then removed by elution with further quantities of dry isopropyl alcohol at 65° C. over a sinter, to give 38 grams of copolymer, containing 42% by weight of butene-1 as measured by infra-red spectroscopy. An ⅛" moulding was prepared as in Example 1, being cooled from 250° C. by quenching in water. This moulding showed clarity of Grade III–IV and 24% haze. A similar moulding allowed to cool in the press showed 25% haze.

Example 4

A litre flask was prepared as in Example 3. In it were placed 400 ccs. 3-methyl-butene, 60 millimoles aluminium diethyl chloride and 20 millimoles TiCl₃ (prepared as in Example 3). The temperature was maintained at 195° C. Butene-1 was passed into the flask until the pressure was 35 mm. Hg above atmospheric and this pressure was maintained while polymerisation took place for 6 hours. Then 400 mls. dry isopropyl alcohol were slowly added to deactivate the catalyst. A good slurry was obtained. It was de-ashed by elution with further quantities of dry isopropyl alcohol under nitrogen at 40° C. 25 g. of copolymer were recovered, containing 66% butene-1 as shown by infra-red analysis. An ⅛" thick compression moulding was made as in Example 1, the moulding temperature being 200° C.; it was cooled by quenching in water. This moulding showed haze of 19.5% and clarity of Grade IV.

Example 5

A litre flask was prepared as in Example 3. In it were placed 400 mls. 3-methyl-butene-1, 21 millimoles aluminium diethyl chloride and 7 millimoles TiCl₃ (prepared as in Example 3). The temperature was held at 15° C. and butene-1 was passed in to give a partial pressure of 35 mm. Hg butene-1. Polymerisation took place at 15° C. for 1½ hours, the partial pressure of butene-1 being maintained constant. The supply of butene-1 was then cut off and the temperature raised to 20° C. over 20 minutes. The partial pressure of butene-1 was then increased to 55 mm. Hg and polymerisation continued for a further 4½ hours. A good slurry resulted. 400 mls. dry isopropyl alcohol were added and the slurry was de-ashed by treatment with further quantities of isopropyl alcohol at room temperature under nitrogen and finally with ethanol at 65° C. 31.5 g. copolymer containing 79% by weight butene-1 were obtained. A ⅛" compression moulding was prepared as in Example 1 at a temperature of 200° C. and quenched; it showed clarity of Grade IV and 9% haze. A similar moulding prepared by pressing at 200° C. and allowing to cool in the press, showed haze of 11.3% while a similar moulding pressed at 250 and quenched showed haze of 13.7%.

Example 6

A litre flask was prepared as in Example 3. In it were placed 240 mls. 3-methyl-butene-1, 107 millimoles aluminium diethyl chloride and 40 millimoles titanium trichloride (prepared as in Example 1). The flask was placed in a water-bath at a temperature of 32° C. and butene-1 was passed in at the rate of 1 litre per hour (measured by rotameter). A good slurry formed. After 5½ hours the catalyst was killed by addition of a mixture of 100 mls. dry acetylacetone and 400 mls. dry isopropyl alcohol, the polymer being worked up by elution with more dry isopropyl alcohol. 61 g. of copolymer were recovered, containing 22% by weight butene-1. An ⅛" compression moulding was prepared by the method of Example 1 at a temperature of 300° C., and quenched; this produced a hard, stiff translucent plaque.

Example 7

A five-litre flask was prepared as in Example 3. In it were placed 2½ litres 3-methyl-butene-1, 187 millimoles aluminium diethyl chloride and 62 millimoles TiCl₃ (prepared as in Example 3). Butene-1 was passed in to maintain a partial pressure of 47–50 mm. Hg and polymerisation took place for 12½ hours at 20° C. A good slurry formed. The catalyst was then destroyed by injecting dry isopropyl alcohol into the flask under pressure. The reaction mixture was allowed to stand overnight in the presence of 500 mls. dry isopropyl alcohol and 120 mls. dry acetylacetone. It was then warmed to 40° C. and unreacted 3-methyl-butene-1 monomer was distilled off. The copolymer was treated further with isopropyl alcohol at 40° C. and then with 10% methanolic hydrochloric acid overnight. Finally it was washed with a methanol/water mixture, filtered and dried at 55° C. under nitrogen. The copolymer obtained had a butene-1 content of 44% by weight. An ⅛″ plaque was compression moulded as in Example 1 at 260° C. and quenched. It showed haze of 16.6%, clarity of Grade IV and total light transmission of 35%.

*Example 8*

A five-litre flask was cleaned, dried and freed of oxygen by flushing with nitrogen. 2.5 litres of 3-methyl-butene-1, which had been standing over 19.3 millimoles aluminium diethyl chloride, were distilled into it. 185 millimoles aluminium diethyl chloride and 62 millimoles TiCl₃ (prepared as in Example 3). The pressure was raised to 63 mm. Hg above atmospheric by passing in butene-1 and polymerisation took place at 20° C. for 13 hours. The catalyst was quenched by injecting 100 mls. dry isopropyl alcohol, followed by treatment with 400 mls. dry isopropyl alcohol mixed with 120 mls. dry acetylacetone. After addition of a further 500 mls. dry isopropyl alcohol the reaction mixture was stood overnight. The temperature of the mixture was then raised to 40° C., causing unreacted 3-methyl-butene to distill off. Ash residues were removed from the copolymer by elution with dry isopropyl alcohol, first at 40° C. then at 50° C. Finally the filtered copolymer was dried and stored under nitrogen. 306 gm. were obtained having a butene-1 content of 61% by weight. The ⅛″ plaques were made by compression moulding as in Example 1 at a temperature of 220° C., one plaque being subsequently quenched and the other allowed to cool in the press. The quenched plaque showed haze 7.6%, clarity Grade III–IV and total light transmission 69%, while the slow cooled plaque showed haze 7.4%, clarity Grade III–IV and total light transmission 70%.

*Example 9*

A five-litre flask was prepared as in Example 8. In it were placed 2.5 litres 3-methyl-butene-1, 187 millimoles aluminium diethyl chloride and 62 millimoles TiCl₃ (prepared as in Example 3). Butene-1 was passed in to give a total pressure of 48 mm. Hg above atmospheric and polymerisation took place at 20° C. for 1 hour 35 minutes. The pressure of butene-1 was then increased until the total pressure in the apparatus was 95 mm. Hg above atmospheric and polymerisation was continued at 20° C. for a further five hours. A good slurry formed with a low proportion of soluble polymer. A mixture of 20 mls. dry acetylacetone and 380 mls. dry isopropyl alcohol were added and the contents allowed to stand overnight. Next morning the temperature was raised to 25° C. and the polymer was washed twice with dry isopropyl alcohol, and twice more at 40° C. The copolymer was dried and stored under nitrogen. 257 g. copolymer were obtained having a content of 82% butene-1 and having a stable crystalline form similar to that of Type II polybutene-1.

Several ⅛″ mouldings were made according to the method of Example 1. Conditions of moulding and properties are shown in the table below.

TABLE 1

| Moulding Temperature | Cooling Conditions | Clarity | Haze, Percent | Total Light Transmission, Percent |
|---|---|---|---|---|
| 200 | Quenched | III–IV | 7.2 | 73.5 |
| 250 | do | IV | 5.6 | 72.0 |
| 300 | do | III–IV | 12.3 | 70.0 |
| 250 | Cooled in Press | III–IV | 10 | 69.0 |

We claim:
1. A crystalline copolymer of 3-methyl-butene-1 containing between 20% and about 90% by weight of n-butene-1 monomer units, having a predominant crystalline form or forms substantially stable at room temperature and closely related to that of Type II polybutene-1.
2. A copolymer as claimed in claim 1 which contains at least 30% by weight and preferably 40% of n-butene-1 monomer units and is transparent (as hereinbefore defined).
3. A copolymer as claimed in claim 2 which is capable of melt shaping into articles having in ⅛″ section clarity of Grade II (as hereinbefore defined).
4. A copolymer as claimed in claim 2 which is capable of melt shaping into articles having in ⅛″ section clarity of Grade III (as hereinbefore defined).
5. A copolymer as claimed in claim 2 which is capable of melt shaping into articles having in ⅛″ section clarity of Grade IV (as hereinbefore defined).
6. A copolymer as claimed in claim 2 which is capable of melt shaping into articles having in ⅛″ section haze of Group 2 (as hereinbefore defined).
7. A copolymer as claimed in claim 2 which is capable of melt shaping into articles having in ⅛″ section haze of Group 3 (as hereinbefore defined).
8. A copolymer as claimed in claim 2 which is capable of melt shaping into articles having in ⅛″ section haze of Group 4 (as hereinbefore defined).
9. A transparent (as hereinbefore defined) article prepared by a melt shaping process from a copolymer claimed in claim 2.
10. A process for preparing a copolymer of 3-methyl-butene-1 and n-butene-1 as claimed in claim 1 wherein the two monomers are treated with a polymerisation catalyst under conditions such that the rate of polymerisation of each monomer is substantially constant throughout polymerisation.
11. A process as claimed in claim 10 wherein polymerisation is carried out in the presence of excess 3-methyl-butene as polymerisation diluent.
12. A process as claimed in claim 10 in which the polymerisation catalyst used comprises an organo-aluminium activator and titanium trichloride obtained by reducing titanium tetrachloride by adding aluminium dialkyl chloride gradually thereto at a temperature of between −20 and +20° C.
13. A process as claimed in claim 12 wherein the organo-aluminium activator is aluminium dialkyl chloride.
14. A process as claimed in claim 10 for preparing a copolymer claimed in claim 2 wherein at the end of polymerisation the copolymer is de-ashed using a water-free reagent.
15. A process as claimed in claim 14 wherein the water-free reagent is an alcohol or a mixture of an alcohol and a chelating agent.
16. Film made from copolymer claimed in claim 1.
17. A bottle made from copolymer claimed in claim 1.

No references cited.

JOSEPH L. SCHOFER, *Primary Examiner.*

L. EDELMAN, *Assistant Examiner.*